United States Patent Office 3,472,996
Patented Oct. 14, 1969

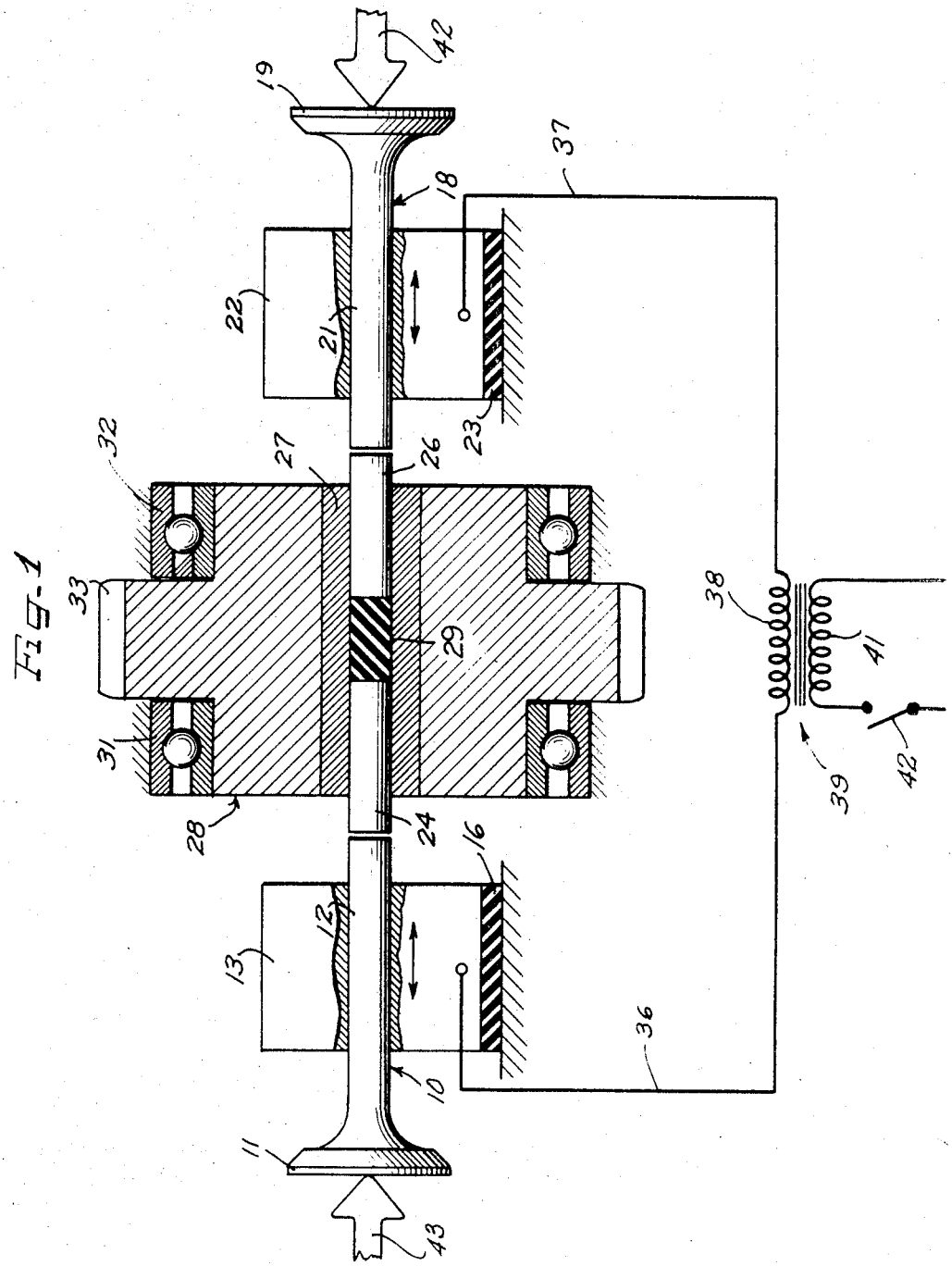

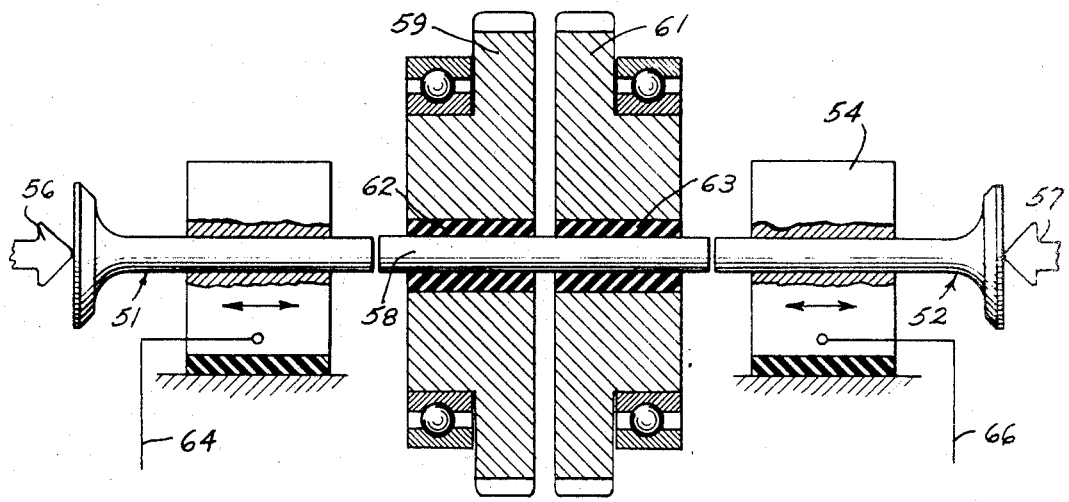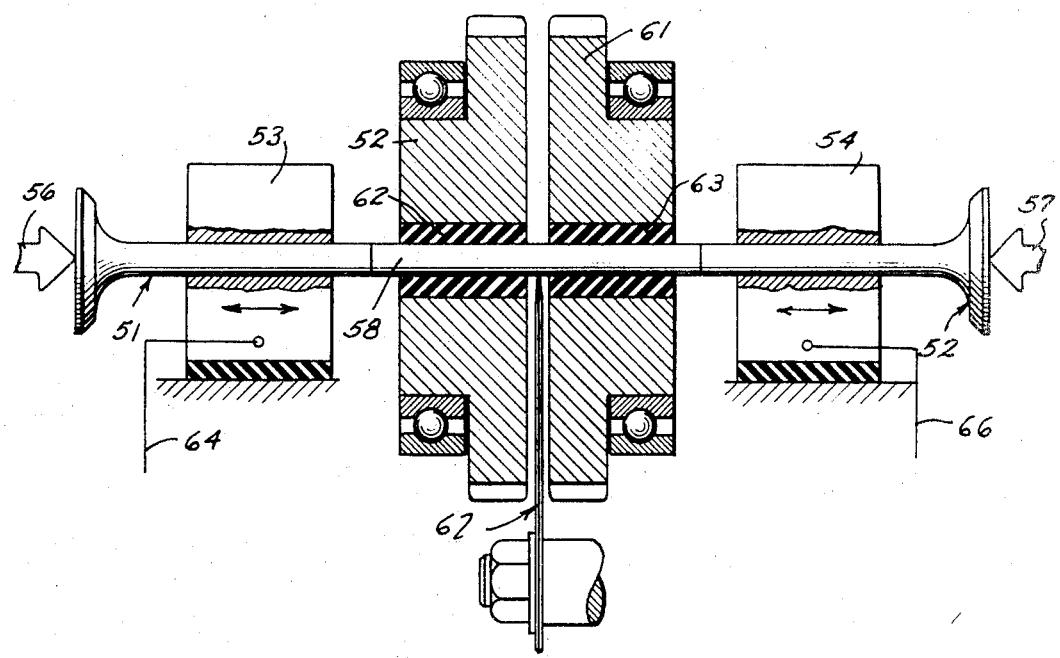

3,472,996
WELDING PROCESS AND APPARATUS
Murray D. Braid, Mentor, and Miles W. Detling, Willoughby, Ohio, assignors to TRW Inc., Cleveland, Ohio, a corporation of Ohio
Filed Nov. 26, 1965, Ser. No. 509,881
Int. Cl. B23k 11/04
U.S. Cl. 219—104                                          7 Claims

ABSTRACT OF THE DISCLOSURE

Method and apparatus for butt welding two cylindrical elements together which involves positioning the elements in coaxial alignment, rotating one of the elements while so aligned, bringing the two elements into abutting engagement with each other with a pressure sufficient to provide a light abrading contact between the elements, and passing a welding current through the resulting assembly.

---

The present invention relates to an improved welding process and apparatus for welding together two cylindrical elements whether solid or in tubular form. While the process and apparatus of the present invention have wide applicability to various types of welded objects, they find particular utility in the welding of stems or tips to poppet valves used in internal combustion engines.

One of the most commonly used methods for welding portions of valves together embodies friction welding, using high rotational speeds for the parts during contact, and high upsetting forces during the actual welding operation. Such systems require rotating parts having a high inertia for strength, and a large horsepower input to drive the high inertia elements, with a comparably high horsepower braking system. These requirements necessarily result in a slow process of building heat into the parts as well as requiring the use of massive components to withstand the forces involved.

Large upset pressures are necessary in conventional welding operations because the surfaces of the metals to be joined become covered with a layer of oxides. These oxides are trapped in the welding area and weaken the weld. The use of large upset forces is required to force such inclusions out of the welding area. This movement of metal wastes material and makes subsequent flash removal operations more difficult.

In addition, during conventional resistance welding, the heating takes place throughout the piece to be welded so that there is a large heat affected zone on both sides of the weld which may weaken the material adjacent to the weld.

It is accordingly an object of the invention to provide an improved welding process which requires considerably less time than conventional friction welding, and requires less complicated and less massive rotating and upsetting parts.

Still another object of the invention is to provide an improved process for welding cylindrical elements which produces only a small amount of flash, and in which the weld joint is free of oxides.

Still another object of the invention is to provide an improved apparatus for butt welding of cylindrical elements, particularly valve parts, which simultaneously welds two valves at the same time, with automatic temperature compensation between the two parts being welded.

Still another object of the invention is to provide an improved apparatus for welding which requires less power for starting and stopping than conventional welding machines presently employed.

Another object of the invention is to provide an improved butt welding apparatus wherein the rotational speeds and pressures are much lower than employed in conventional friction welding assemblies.

In accordance with the method of the present invention, the two cylindrical elements to be welded are aligned coaxially, and one element is rotated with respect to the other. The two elements are brought into abutting contact, and a *welding current* is passed through the two elements while in such contact. The force may be applied at a constant value before and during welding, or it may be at a relatively low constant value initially and raised to a high value near the end of the welding cycle, or a variable increasing force may be applied between the elements from the time they are first brought into contact until welding is completed. When the joint between the elements has reached the welding temperature, the rotation of the rotating element is terminated. With this type of arrangement, the rotating means can be a low inertia chucking device, instead of a massive, high inertia rotating device as previously used.

A further description of the present invention will be made in conjunction with the attached sheet of drawings which illustrate several embodiments of the invention.

In the drawings:

FIGURE 1 is a somewhat schematic view, partly in cross-section and partly in elevation, illustrating one form of the present invention;

FIGURE 2 is a view similar to FIGURE 1, but illustrating a modified form of the invention; and FIGURE 3 is a view of the assembly shown in FIGURE 2, and illustrating the manner in which the cutting means cooperates with the welding assembly to sever the welded valve structure in two.

While the following detailed description deals with the welding of tips to headed valve stems, it should be understood that the invention is also applicable to welding stems to valve heads, or both a valve stem and a valve tip to a valve head, the elements to be welded consisting of similar or dissimilar metals.

In FIGURE 1, reference numeral 10 indicates generally a headed valve stem to which a tip is to be welded and consisting of a head portion 11 and a stem portion 12. The stem portion 12 is rigidly held within a clamp 13 against rotation, but the clamp 13 is laterally movable along a table 14, the clamp 13 being spaced from the table 14 by means of an electrical insulator 16.

Similarly, at the opposite end of the assembly, there is provided a second headed valve stem 18 consisting of a head portion 19 and a stem portion 21, the latter being rigidly received by a clamp 22. An insulator 23 separates the clamp 22 from the table 14. As illustrated in FIGURE 1, the clamp means 13 and 22 are arranged so that the headed valve stems 10 and 18 carried thereby are in coaxial alignment with each other.

The valve tips to be welded to the valve stems 10 and 18 respectively have been identified at reference numerals 24 and 26 respectively. The tips 24 and 26 are supported in coaxial alignment with the valve stems 10 and 18 by being tightly received within a conducting bushing clamp 27 carried in a spindle generally indicated at reference numeral 28 in the drawings. A dielectric spacer 29 is interposed between the valve tips 24 and 26 so that resistance heating between the two valve tips does not take place.

The spindle 28 is supported for rotation between a pair of opposed bearings 31 and 32 and may be provided with gear teeth 33 or the like for driving the same at an appropriate rate of speed. The spindle 28 need not have a high degree of inertia as in the case of conventional friction welding apparatus.

The clamps 13 and 22 are energized with a welding current by means of conductors 36 and 37 connected to the secondary 38 of a transformer 39. A primary 41 of the transformer 39 is connected to a suitable source of power (not shown), the secondary 38 providing a low voltage, high current power source of sufficient intensity to cause resistance heating at the weld joints. A switch 42 is provided to control the energization of the primary 41. Of course, other power sources can be used, such as a generator feeding direct current to the clamps 13 and 22.

The assembly is also provided with a pair of opposed pressure applying means such as rods 43 and 44 which are arranged to move the clamps 13 and 22, and the valve stems carried thereby, into butting relationship with the tips 24 and 26 at a variable contact pressure. Initially, the pressure applied to the valve heads 11 and 19 is sufficiently to move the stems 10 and 18 into an abrading contact with the tips 24 and 26, while the tips are rotating with the spindle 28. Then, the switch 42 is closed, to provide a high current through the assembly, causing resistance heating at the weld joints. The pressure existing at the weld joints initially, however, is somewhat greater than exists in normal flash welding where a high current flows through relatively few contact points. In normal flash welding, melting occurs instantaneously at these points of contact, and violent vaporization of the metal occurs. This causes the expulsion of small particles of hot metal as flash. This flashing is continued until the surfaces are coated with a layer of the molten metal.

In the system of this invention, however, the pressure is sufficient to provide abrading contact between the two surfaces being welded, so that there is a substantial area of contact between these surfaces, so that practically no flashing occurs. This eliminates the gas pocket trouble usually associated with flash butt welding, and also eliminates the presence of residual cast metal in the weld.

The spindle 28 continues to rotate while the current is applied and a welding temperature is reached. Because the welds are in series, the one with the smaller area of contact has a higher resistance, causing it to get hotter and thereby increasing the contact area. This results in making the other weld joint the high resistance joint, so that both joints are heated uniformly. When the current has been passed through the system long enough to produce welding heat, the spindle 28 is braked, and the flow of current is terminated, thereby completing the weld.

After the weld has been completed, the unit can be indexed to another position and driven at a suitable speed to allow machining of any flash produced from the welding operation. After the flash has been removed, the unit can be indexed to another position at which point the rods 43 and 44 can be released, and the valves withdrawn. If desired, a separate station can be provided for flash annealing between the welding station and the machining station where the flash is removed.

The embodiment of the invention illustrated in FIGURES 2 and 3 is similar in many respects to that of FIGURE 1 but utilizes a single tip piece for simultaneous welding to two headed valve stems. The valve stems 51 and 52 are securely clamped in electrically conductive clamps 53 and 54 respectively, the clamps 53 and 54 being laterally movable in response to pressure supplied to the stem 51 and 52 by oppositely acting rods 56 and 57, as in the previous embodiment. In the assembly of FIGURE 2, however, there is provided a single tip piece 58 which is supported for rotation between a pair of spaced spindles 59 and 61 driven in unison from a common drive source (not shown). Electrically insulating sleeves 62 and 63 are provided to hold the tip piece 58 securely in the spindles 59 and 61. Electrical conductors 64 and 66 are provided to supply the welding current to the clamps 53 and 54.

The operation of the system of FIGURE 2 is substantially similar to that of FIGURE 1 in that the valve stems 51 and 52 are moved into abutting contact with the opposite ends of the tip piece 58, with a light but firm abrading contact therebetween as the spindles 59 and 61 are rotated. The welding current is passed through the clamps 53 and 54 until such time as the welding temperature is reached, whereupon the pressure provided by the rods 56 and 57 may be increased to an upsetting pressure which completes the weld. The entire assembly is then moved to another station, as illustrated in FIGURE 3, where a cutting wheel 67 arranged to fit between the spindles 59 and 61 bisects the doubly welded, double ended valve structure to provide two separate valves.

The process and apparatus of the present invention produce reliable welds at least equal in quality to those produced by friction welding. With the arrangement illustrated, two parts can be welded at the same time very conveniently. The process can be used for welding stems to heads, or tips to stems, or for welding hollow stems or stems of different metals to the valve head. The apparatus is considerably easier to handle than conventional upset welding machines, since the mass of the rotating parts can be smaller, thus reducing the power required for starting and stopping. Since the heat is furnished from electrical resistance, rotational speeds and pressures may be much lower than used in pure frictional welding. The machine can be made entirely automatic in operation, and lends itself to automatic removal of flash in the same cycle. All upset forces are taken up directly into the parts through stationary portions of the assembly, thus eliminating heavy thrust loads on the rotating members.

In a typical embodiment of the present invention, a headed valve element of corrosion resistant material was joined to a stem of different material at a diameter of 0.359 inch. The rotational speed was 2160 r.p.m., and a constant force of 1500 lbs. was applied during the entire cycle. The duration of the welding cycle was 1.3 seconds the rotation of the parts commencing 0.2 second before the current was applied for the remaining 1.1 seconds. The applied voltage was 5.2 volts AC, at a current of 14,423 amperes. The resulting weld was found to be of good quality.

It should be evident that various modifications can be made to the described embodiments without departing from the scope of the present invention.

We claim as our invention:

1. The method of butt welding two cylindrical elements together which comprises rotating one of said elements with respect to the other while the two elements are coaxially aligned, bringing the two elements into abutting contact with sufficient pressure to provide abrading contact between the elements, passing a welding current through the two elements while in such contact, and terminating the rotation of said one element when the joint between the elements has reached a welding temperature.

2. The method of butt welding a valve tip to a headed valve stem which comprises rotating said tip with respect to said stem while said tip and said stem are coaxially aligned, bringing said stem and tip into abutting contact with sufficient pressure to provide abrading contact between said stem and said tip, passing a welding current through the stem and tip while in such contact, and terminating the rotation of said tip when the join between said tip and said stem has reached a welding temperature.

3. The method of simultaneously welding valve tips to a pair of headed stems which comprises positioning a pair of said stems in confronting relation to a single valve tip piece, rotating said valve tip piece, bringing said pair of stems into abutting engagement with said valve tip piece while said piece is being rotated with a pressure sufficient to provide abrading contact between said stems and said valve tip piece, passing a welding current through said stems and said tip in series, terminating the rotation of said valve tip piece when the joints between said piece and said stems reach a welding temperature, and severing said valve tip piece to provide a pair of welded valve stems.

4. An apparatus for welding valve tips to a pair of headed valve stems which comprises a pair of movable clamp means arranged to position a pair of headed valve stems in coaxial relation, a spindle coaxial with said pair of stems and located therebetween, means for rotating said spindle, electrically conductive clamping means positioned to support a pair of valve tips in spaced coaxial alignment with said headed valve stems, said clamping means providing for passage of electric current between said valve tips and said valve stem in electrical series relationship, means for applying pressure to the heads of said valve stems to thereby engage stems with said tips at a variable contact pressure, and means for energizing said movable clamp means with a welding current.

5. The apparatus of claim 4 which also includes a dielectric spacer means in said clamping means for spacing the ends of said valve tips when supported therein.

6. An apparatus for welding valve tips to a pair of headed valve stems which comprises a pair of movable clamp means arranged to position a pair of headed valve stems in coaxial relation, a spindle positioned to hold a valve stem piece in coaxial alignment between said headed valve stems, means for rotating said spindle, means for moving said pair of clamp means toward and away from said valve stem piece to thereby provide for a variable contact pressure between said stem piece and said valve stems, means for energizing said clamp means with a welding current, and cutting means for bisecting said valve stem piece after said piece has been welded to said valve stem.

7. The apparatus of claim 6 in which said spindle includes two spaced spindle elements, and said cutting means is arranged to move between said spindle element in bisecting said valve stem piece.

References Cited

UNITED STATES PATENTS

| 438,657 | 10/1890 | Thomson | 219—104 |
|---|---|---|---|
| 2,193,490 | 3/1940 | Rehse | 219—101 |
| 2,471,937 | 5/1949 | Colwell | 219—104 XR |
| 3,314,583 | 4/1967 | Roberts | 228—2 |

JOSEPH V. TRUHE, Primary Examiner

L. A. SCHUTZMAN, Assistant Examiner

U.S. Cl. X.R.

219—117